(12) United States Patent
Rapp

(10) Patent No.: US 7,088,496 B2
(45) Date of Patent: Aug. 8, 2006

(54) METHOD FOR CONTROLLING A PUMP UNIT WHILE OPTICALLY AMPLIFYING A TRANSMITTED WAVELENGTH MULTIPLEX (WDM) SIGNAL

(75) Inventor: Lutz Rapp, Deisenhofen (DE)

(73) Assignee: Siemens Aktiengesellschaft, Munich (DE)

( * ) Notice: Subject to any disclaimer, the term of this patent is extended or adjusted under 35 U.S.C. 154(b) by 173 days.

(21) Appl. No.: 10/488,324

(22) PCT Filed: Sep. 10, 2002

(86) PCT No.: PCT/DE02/03353

§ 371 (c)(1),
(2), (4) Date: Feb. 27, 2004

(87) PCT Pub. No.: WO03/026085

PCT Pub. Date: Mar. 27, 2003

(65) Prior Publication Data

US 2005/0002089 A1    Jan. 6, 2005

(30) Foreign Application Priority Data

Sep. 12, 2001 (DE) ................................ 101 44 948

(51) Int. Cl.
*H10S 3/00* (2006.01)
(52) U.S. Cl. .................................... 359/337; 359/341.4
(58) Field of Classification Search ........... 359/341.33, 359/337, 341.4
See application file for complete search history.

(56) References Cited

U.S. PATENT DOCUMENTS

| | | | | |
|---|---|---|---|---|
| 5,140,456 A | * | 8/1992 | Huber ................... 359/341.33 |
| 5,185,826 A | * | 2/1993 | Delavaux ..................... 385/24 |
| 5,218,608 A | * | 6/1993 | Aoki .............................. 372/6 |
| 5,253,104 A | * | 10/1993 | Delavaux ............... 359/341.33 |
| 5,283,686 A | * | 2/1994 | Huber ....................... 359/337 |
| 5,287,216 A | * | 2/1994 | Chirravuri et al. ..... 359/341.33 |
| 5,430,572 A | * | 7/1995 | DiGiovanni et al. ... 359/341.33 |
| 5,623,362 A | * | 4/1997 | Mitsuda et al. ........ 359/341.33 |
| 5,640,268 A | * | 6/1997 | Chesnoy ................ 359/341.33 |
| 5,706,124 A | * | 1/1998 | Imoto et al. ............. 359/337.1 |
| 5,745,283 A | | 4/1998 | Inagaki et al. |

(Continued)

FOREIGN PATENT DOCUMENTS

DE    100 58 059 A1    6/2001

(Continued)

OTHER PUBLICATIONS

Becker, Olsson, Simpson. Erbium-Doped Fiber Amplifiers: Fundimantals and Technology. Academic Press, San Diego CA, 1999.*

(Continued)

*Primary Examiner*—Jack Keith
*Assistant Examiner*—Ari M Diacou

(57) ABSTRACT

The invention relates to a novel method for controlling a pump unit of a fiber amplifier, with which a transmitted wavelength multiplex (WDM) signal is amplified by at least a distribution of output powers of a plurality of pump sources in order to achieve a favorable noise figure of the amplified WDM signal at a variable required overall pump power. The output powers are distributed using modulation characteristics for the pump sources depending on the overall pump power required for amplification. The modulation characteristics influence the respective inversions in the fiber amplifier in such a manner that a minimum noise figure is achieved for all channels of the WDM signal at a constant gain.

5 Claims, 4 Drawing Sheets

U.S. PATENT DOCUMENTS

| | | | | |
|---|---|---|---|---|
| 5,923,684 | A * | 7/1999 | DiGiovanni et al. | 372/6 |
| 6,038,061 | A * | 3/2000 | Sugaya | 359/337 |
| 6,064,515 | A * | 5/2000 | Yang | 359/341.33 |
| 6,091,542 | A * | 7/2000 | Yang | 359/341.33 |
| 6,111,686 | A * | 8/2000 | Toyohara | 359/337.13 |
| 6,201,637 | B1 * | 3/2001 | Nilsson et al. | 359/341.33 |
| 6,204,960 | B1 * | 3/2001 | Desurvire | 359/341.33 |
| 6,327,076 | B1 * | 12/2001 | Akiyama | 359/337.11 |
| 6,373,625 | B1 * | 4/2002 | Kobayashi et al. | 359/341.41 |
| 6,441,954 | B1 * | 8/2002 | Yadlowsky | 359/341.31 |
| 6,452,721 | B1 * | 9/2002 | Deguchi et al. | 359/341.33 |
| 6,452,722 | B1 * | 9/2002 | Krummrich et al. | 359/341.41 |
| 6,519,080 | B1 * | 2/2003 | Vavassori et al. | 359/341.31 |
| 6,542,291 | B1 * | 4/2003 | Kinoshita et al. | 359/341.33 |
| 6,690,505 | B1 * | 2/2004 | Ye | 359/337 |
| 6,738,184 | B1 * | 5/2004 | Hayashi et al. | 359/341.4 |
| 6,775,055 | B1 * | 8/2004 | Tsuzaki et al. | 359/334 |
| 2001/0048545 | A1 * | 12/2001 | Shimojoh | 359/341.1 |
| 2002/0101652 | A1 * | 8/2002 | Hayashi et al. | 359/341.4 |
| 2002/0154389 | A1 * | 10/2002 | Vasilyev et al. | 359/341.3 |
| 2002/0186458 | A1 * | 12/2002 | Gao et al. | 359/341.4 |
| 2003/0169487 | A1 * | 9/2003 | Feldman et al. | 359/341.4 |

FOREIGN PATENT DOCUMENTS

| | | |
|---|---|---|
| EP | 0 762 569 A2 | 3/1997 |
| EP | 1 045 535 A2 | 10/2000 |
| EP | 1 115 185 A2 | 7/2001 |

OTHER PUBLICATIONS

Govind Agrawal, Fiber-Optic Communication Systems 3$^{rd}$ Ed. Wiley, New York, 2002.*

Ole Lumholt, Jorn H. Povlsen, Kim Schusler, Anders Bjarklev, Svend Dahl-Petersen, Thomas Rasmussen and Karsten Rottwitt, "Quantum Limited Noise Figure Operation of HighGain Erbium Doped Fiber Amplifiers", Journal of Lightwave Technology, vol. 11, No. 8, Aug. 1993, pp. 1344-1352.

Tomoharu Kitabayashi, Takuya Aizawa, Tetsuya Sakai and Akira Wada, "Active Gain-Slope Compensation of EDFA Using Thulium-Doped Fiber as Saturable Absorber", IEICE Tran. Electron, vol. E84-C, No. 5, May 2001, pp. 605-609.

Kunihiko Isshiki, Yuusuke Kuze, Masao Kubota, Shoichiro Yamaguchi, Masaki Nakaoka, Hiromitsu Watanabe and Kumio Kasahara, Reliable 1.01-µm Band Laser Diode Pumped Praseodymium-Doped In/Ga-Based Fluoride Fiber Amplifiers at 1.3 µm, Journal of Lightwave Technology, vol. 16, No. 12, Dec. 1998, pp. 2373-2377.

Yan Sun, Atul K. Srivastava, Jianhui Zhou, James W. Sulhoff, "Optical Fiber Amplifiers for WDM Optical Networks", Bell Labs Technical Journal, vol. 4, Issue 1, pp. 187-206.

* cited by examiner

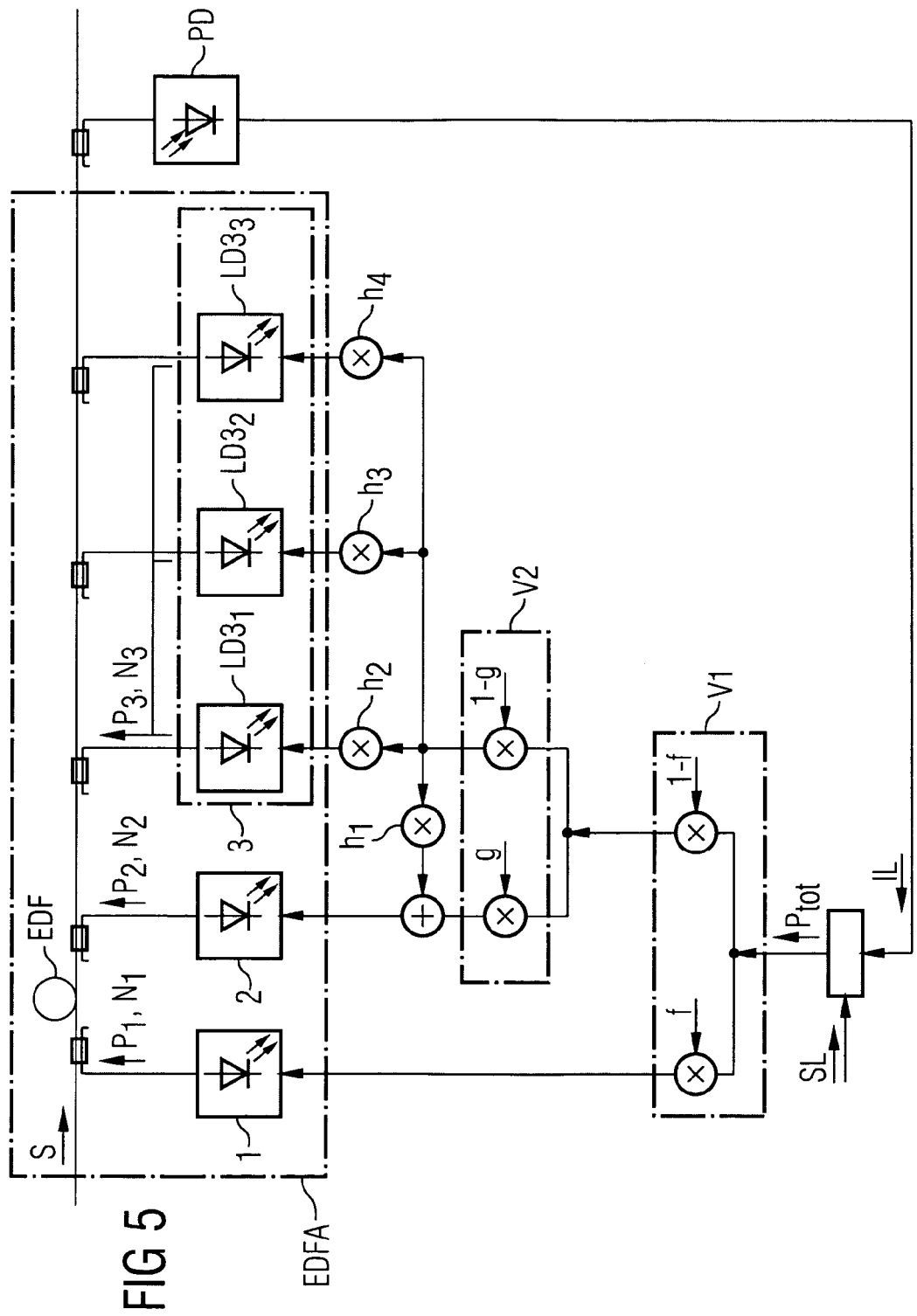

US 7,088,496 B2

METHOD FOR CONTROLLING A PUMP UNIT WHILE OPTICALLY AMPLIFYING A TRANSMITTED WAVELENGTH MULTIPLEX (WDM) SIGNAL

CROSS REFERENCE TO RELATED APPLICATIONS

This application is the US National Stage of International Application No. PCT/DE02/03353, filed Sep. 10, 2002 and claims the benefit thereof. The International Application claims the benefits of German application No. 10144948.8 filed Sep. 12, 2001, both of the applications are incorporated by reference herein in their entirety.

FIELD OF INVENTION

The invention relates to a method for controlling a pump device for optical amplification of a transmitted wavelength division multiplex (WDM) signal according to the preambles of claims 1 and 5.

BACKGROUND OF INVENTION

In order to transmit an optical WDM signal over long fiber links, amplifier modules are required after individual transmission sections. An effective method for additional amplification of a signal is based on the use of at least one erbium-doped fiber amplifier EDFA which comprise one or more pump sources connected to an erbium-doped fiber EDF, said pump sources having wavelengths of approx. 980 nm and/or 1480 nm for amplification of the WDM signal in the C and L bands (approx. 1525–1565 nm and approx. 1570–1610 nm). An implementation of an erbium-doped fiber amplifier is known from U.S. Pat. No. 5,140,456. In that implementation pump signals from the pump sources are injected into the erbium-doped fiber and enable an inversion or partial population of a higher energy level through absorption which can lead to a gain or loss depending on the degree of inversion and depending on the wavelength range of the WDM signal. The main purpose of an erbium-doped fiber amplifier EDFA is to ensure a flat and high gain with a low noise figure. An example of the implementation of a fiber amplifier of this type is described in detail in "Optical Fiber Amplifier for WDM Optical Networks", Sun Y., Srivastava A. K., Zhou Jianhui, Sulhoff J. W., Bell Technical Journal, January–March 1999. In order to achieve a low noise figure together with a high gain, for a two-stage amplifier (see FIG. 2) a high inversion is set in the first stage and a small inversion in the second stage (see page 189, 1st column).

Methods for compensating a tilting of the gain for all channels of the WDM signal are also known. A topical example is described in "Active Gain-Slope Compensation of EDFA Using Thulium-Doped Fiber as Saturable Absorber", Kitabayashi T., Aizawa T., Sakai T., Wada A., IEICE Transactions on Electronics, Vol. E84-C, No. 5, pp. 605–609, May 2001. In this case, with the use of cascaded thulium-doped and erbium-doped fibers the positive and negative gain tilts are compensated in the C band. A requirement for this is the use of the thulium doped fibers in the saturation range in the case of a transmission in the C band.

Also known from EP 1 045 535 A2 is a means of control for obtaining a flat gain for all channels of a transmitted WDM signal, in particular in the event of temperature changes (see Abstract).

The means of control comprises among other things a pump device with two pump sources disposed distributed over an erbium-doped fiber EDF for amplifying a transmitted WDM signal whose power at the end of the transmission section is determined by means of a photodiode and controlled in such a way that corresponding output powers of the pump sources are regulated by means of a control circuit in order to achieve a wavelength-independent gain for all channels of the WDM signal at the end of the transmission section. Two further photodiodes and a variable optical attenuation element controlled by a controller are provided in order to vary the gain of the transmitted channels.

The current amplifiers for WDM signals are therefore implemented in such a way as to deliver optimal noise figures and/or wavelength-independent and high gains at the maximum channel number as signal utilization. Due to the high channel numbers of modern WDM transmission systems, the pumping of the erbium-doped fiber(s) requires very high pump powers which often can only be provided by coupling pump light into the erbium-doped fiber at multiple points within an amplifier stage.

At startup time there are generally only a few channels active simultaneously or the transmission system is already configured such that it can be expanded only up to a certain number of channels. Due to the significantly reduced input and output powers compared to the full expansion, however, a lower pump output must be set. If each of the pump powers is now reduced by a proportion, this may lead to an increase in the noise figure.

The following figure (FIG. 1) describes an optical amplification according to the prior art. Its characteristics are explained and the disadvantages which are eliminated by the present invention described.

In FIG. 1 the noise figure NF is shown as a function of the input power P of the WDM signal. In order to amplify the WDM signal, a pump device with two pump sources disposed over an erbium-doped fiber is provided. The first pump source has a wavelength of 980 nm and the second pump source has wavelengths of 980 nm (curve C1) and 1480 nm (curve C2). It is assumed that corresponding pump signals of the investigated pump device are injected co- and contradirectionally in the input area and in a further area, respectively, of the erbium doped fiber. With this pump device, each of the pump powers of the pump sources is reduced or increased in equal proportions depending on the change in the input power of the WDM signal, i.e. also depending on the change in the number of active channels. With small input powers, the noise figure increases.

DE 100 58 059 A1 discloses an optical amplifier for WDM signals which comprises a replaceable fiber module for adjusting the amplification to different input levels while achieving optimal noise performance.

In order to achieve small noise figures, there is known from the literature source "Quantum Limited Noise Figure Operation of High Gain Erbium Doped Fiber Amplifiers", Lumbohlt et al., Journal of Lightwave Technology, Vol. 11, No. 8, August 1993, an optical amplifier with a co-, contra- or bidirectionally pumped amplification fiber over which an insulator to suppress the noise from ASE (Amplified Spontaneous Emission) is disposed. Depending on the positioning of the insulator along the amplification fiber, the noise figure is correspondingly adjustable and can therefore be minimized.

A further literature source "Reliable 1.01-µm Band Laser Diode Pumped Praseodynium-Doped In/Ga-Based Fluoride Fiber Amplifiers at 1.3 µm", Isshiki et al., Journal of Lightwave Technology, Vol. 16, No. 12, December 1998 discloses a bidirectionally pumped optical fiber amplifier with a praseodynium-doped In/Ga-based fluoride fiber as the amplification fiber. The levels of an amplified WDM signal at the output of the optical fiber amplifier can be compensated with the aid of a control unit by means of a control of pump laser diodes inserted in the circuit between control unit on the one side and input and output line on the other side. A suitable length of amplification fiber must be chosen in order to achieve high gains of the optical fiber amplifier.

Similarly for controlling the gain there is known from U.S. Pat. No. 5,745,283 a bidirectional pumped fiber amplifier with two laser diodes as pump source for amplification of multiple channels of a WDM signal whose individual pump powers are controlled as a function of a tapped-off proportion of each output line of the channels at the end of the fiber amplifier. In this way differences in gain between the channels are suppressed. A separation of each channel at the end of the fiber amplifier remains complicated and expensive, however. If there are changes to or an expansion of the number of channels, this system does not allow any flexible solution.

Finally, U.S. Pat. No. 6,111,686 discloses an optical amplifier and a method for optical amplification of a signal wherein a reduction in the power consumption as well as in the costs of the system is achieved mainly through the use of a single pump source instead of two pump sources. With known methods, two different modes of operation are provided. On the one hand, in order to reduce the noise figure of the optical amplfier, the output pump power is subdivided into two pump signals for ce and contradirectional pumping such that the power of the first codirectional pump signal is higher than that of the second contradirectional pump signal. On the other hand, in order to achieve a high output power of the optical amplifier, the power of the second pump signal is set to a greater value than that of the first pump signal. Apart from these two settings, namely to achieve a small noise figure on the one hand and to achieve a high output power on the other hand, no further settings are provided.

SUMMARY OF INVENTION

The object of the present invention is therefore to specify a method for controlling pump powers of a plurality of pump sources for a varying required total pump power for amplification of a WDM signal with minimal noise figure.

This object is achieved according to the invention by a method which is characterized by the features of claims 1 and 5.

Advantageous developments are described in the dependent claims.

Based on a method according to the features of the preamble of claim 1, it is provided according to the invention that the determined actual power of the WDM signal is compared with a reference power, and that a required total pump power is set and that in order to achieve an optimal noise figure of the WDM signal the output powers of the first and second pump sources are set as a function of the required total pump power in such a way that in the fiber amplifier in the case of a low total pump power a high inversion is produced at the input of the fiber by the first pump source and a small inversion is produced in a further part of the fiber by the second pump source, and that with increasing required total pump power the pump power of the first pump source increases more strongly initially and less strongly subsequently than the pump power of the second pump source. In this way the noise figure of the fiber amplifier is kept low.

In order to set the inversions in the fiber amplifier, inventive modulation characteristics are determined for the first and second pump source for an advantageous distribution of the total required pump power to the first and second pump source.

According to an advantageous development of the invention it is provided that the total required pump power is distributed to the first and second pump sources according to proportion parameters which are computed and stored according to corresponding relationships as a function of the required total pump power and can further be retrieved from one or more stored tables.

Gradient and curvature parameters of the modulation characteristics of the pump sources are chosen such that initially the high inversion at the start of the transmission section and subsequently the small inversion at the end of the transmission section are ensured according to the total required pump power. An operation of the pump sources below their threshold currents is similarly avoided in particular with contradirectional pumps. Furthermore signal distortions are avoided by means of a constant ability to differentiate the modulation characteristics of the pump sources.

In the method according to the invention, all channels will show a flat gain for different required total pump powers at the end of the fiber amplifier.

The method according to the invention can be extended to more than two pump sources. Further inventive modulation characteristics of the output power of additional pump sources are defined and stored as a function of the total pump power required, with the result that at the end of the fiber amplifier a minimal noise figure of the WDM signal is achieved by an optimal setting of the inversions corresponding to the pump sources.

The extension to more than two pump sources in the fiber amplifier serves to increase the output powers of the original two pump sources, e.g. in the case of an in-service channel number increase. As a result the gain of the old channels remains constant and the necessary gain of the new channels is likewise correctly adjusted.

BRIEF DESCRIPTION OF THE DRAWINGS

An exemplary embodiment of the invention is described in more detail with reference to the drawing, in which:

FIG. 5: shows the schematic principle of the method according to the invention for a fiber amplifier with more than two pump sources.

DETAILED DESCRIPTION OF INVENTION

Figure 2:
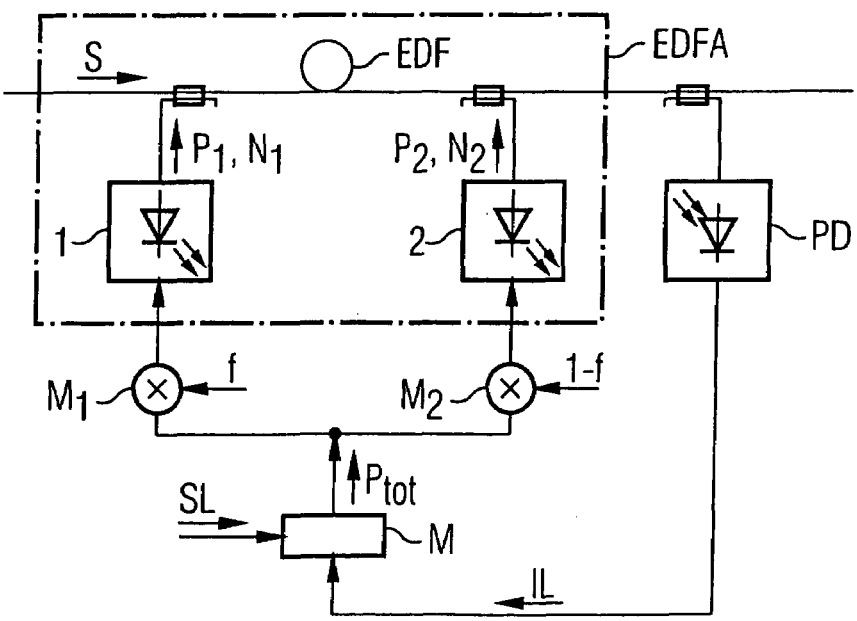
FIG. 2: shows the schematic principle of the method according to the invention for a fiber amplifier with two pump sources.

The circuit depicted in FIG. 2 shows a fiber amplifier EDFA operating according to the inventive method with a control arrangement for a pump device connected to an erbium-doped fiber EDF. Other variants of fibers such as, for example, a thulium-doped fiber could also be used instead of an erbium doped fiber EDF. A first pump source 1, the pump signal of which operates in the input area of the fiber amplifier EDFA, and a second pump source 2, the pump signal of which operates in the further area of the fiber amplifier EDFA, are used in order to amplify a transmitted WDM signal S. At the output of the fiber amplifier EDFA, an actual power IL of the WDMsignal S is determined, for example using a photodiode PD, and compared with a reference power SL by means of a module M. The reference power SL is predetermined and set according to the characteristics of the WDM signal during the transmission ahead of the fiber amplifier EDFA, i.e. for example with changes in channel number such that new values of the reference power SL lead to the setting of a desired gain of the active channels. Following the comparison of the actual power IL with the reference power a, a required total pump power $P_{tot}$ is set which is distributed to the output powers P1 and P2 of the pump sources 1, 2 in order to achieve a minimal noise figure of the amplified WDM signal S. The distribution is performed as a function of the total pump power $P_{tot}$ by means of a proportion parameter $f(P_{tot})$ or $1-f(P_{tot})$, which is also referred to simply as f in the following. In practice signals for modulating the output powers P1, P2 or the inversions N1, N2 of the first and second pump sources 1, 2 are controlled by means of analog multipliers or digital signal processors M1, M2 with the proportion parameter f or 1−f. The proportion parameter f or 1−f can be newly retrieved from a stored table depending on the required pump power pot. The inversions N1 and N2 should be considered together and designate a total mean inversion at the fiber input or at the further fiber part. With the present method the mean inversion should be kept constant.

Figure 3:
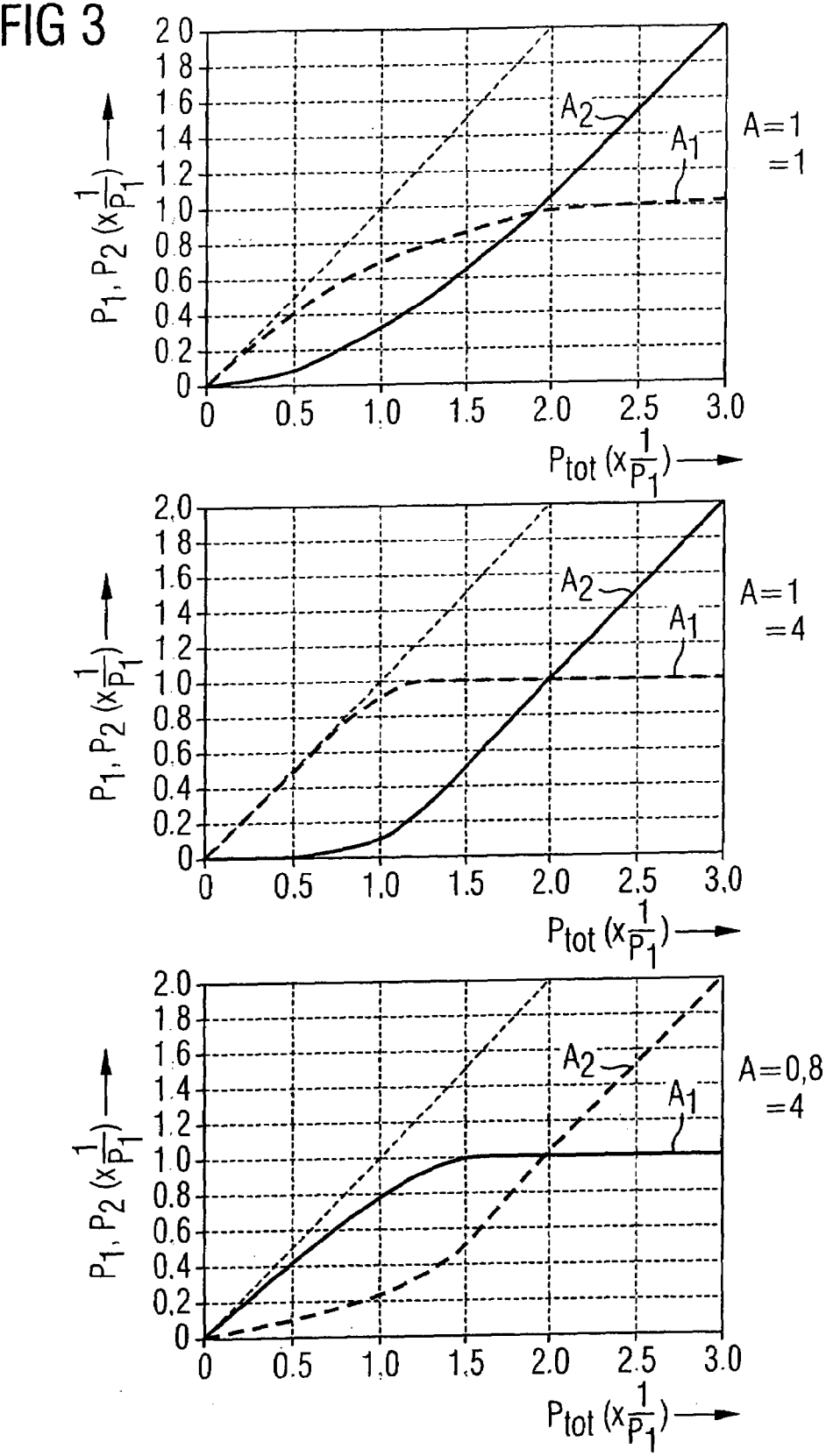
FIG. 3: shows the inventive modulation characteristics of two pump sources for different parameter values.

FIG. 3 shows inventive modulation characteristics A1, A2 of the output powers P1, P2 of the two pump sources 1, 2. Entered values of the output powers P1, P2 as a function of the total pump power $P_{tot}$ and also the total pump power tot are normalized to the nominal power of the first pump source 1. In principle the output power P1 of the first pump source takes precedence until the latter is close to its maximum power, and only then is the output power P2 of the second pump source also increased. In contrast to traditional methods the modulation characteristics A1, A2 are defined nonlinearly by means of an inventive setting of the gradient of the proportion parameter $f(P_{tot})$. The gradient of $f(P_{tot})$ is positive in the case of a small total pump power $P_{tot}$, proceeds constantly, decreases with increasing total pump power $P_{tot}$ and reaches the value zero as a minimum. As a result the output power P2 of the second pump source 2 is only increased when the output powers P1 of the first pump source 1 are correspondingly sufficiently large. Physically this means that in the fiber amplifier EDFA, at a low total pump power $P_{tot}$, a high inversion N1 is produced by the first pump source 1 and a small inversion N2 is produced by the second pump source 2, and that with increasing total pump power $P_{tot}$ the pump power of the first pump source 1 increases initially more strongly and subsequently less strongly than the pump power of the second pump source 2. By this means the noise figure NF is kept at a minimal value.

The modulation characteristics A1, A2 for setting the output powers P1, P2 are defined by the following relationship:

$$P1 = f \times P_{tot} \quad \text{A1}$$

$$P2 = (1-f) \times P_{tot} \quad \text{A2}$$

Here, the proportion parameter f can be set according to the following relationship:

$$f = A \cdot \exp\left[-\frac{1}{\alpha} \cdot \exp(-1) \cdot (A \cdot P_{tot})^{\alpha}\right] \text{ for } P_{tot} \leq \frac{1}{A} \cdot \exp\left(\frac{1}{\alpha}\right) \text{ and}$$

$$f = \frac{1}{P_{tot}} \text{ for } P_{tot} > \frac{1}{A} \cdot \exp\left(\frac{1}{\alpha}\right)$$

where A denotes the gradient at the selection zero point of the modulation characteristic A1 of the pump source 1 and α denotes the curvature parameter of the modulation characteristics A1, A2 of the two pump sources 1, 2. FIG. 3 shows three possible sets of modulation characteristics A1, A2 for different parameters A, α. The representation with A=1 and α=1 shows the inentive profile of the modulation characteristics A1, A2 so that the inversions N1, N2 are produced correctly. This means that the output powers P1, P2 of the pump sources 1, 2 are not reduced or increased by the same proportion with different required total pump powers $P_{tot}$, but are set according to the unequal proportion parameters f, 1−f as a function of the total pump power $P_{tot}$. The exemplary embodiment shown in FIG. 3 with A=1 and α=4 shows two modulation characteristics A1, A2 with strong curvature due to the choice of a large value for the curvature parameter α. It is advantageous here that the inversion N2 is much smaller than the inversion N1 with small total pump power $P_{tot}$. As a result the noise figure becomes considerably smaller. If the curvature parameter α has a high value, however, sharp break points of the modulation characteristics A1, A2 are formed at a total pump power $P_{tot}$ of approx. $P_{tot}$=P1. With sharp break points, distortions of the WDM signal S can occur due to oscillations of the control. For this reason the value of the curvature parameter α should also be selected appropriately. The last exemplary embodimet in FIG. 3 with A=0.8 and α=4 shows an optimal inventive setting of the modulation characteristics A1, A2 of the two pump sources 1, 2 as a function of the total pump power $P_{tot}$. Furthermore the pump sources 1, 2 are always operated above their threshold currents in ongoing operation. This applies in particular to contradirectional pumps.

In order to set the pump powers of the first and second pump source 1, 2 appropriately, the proportion parameter f or 1−f can be retrieved from a stored table.

Figure 1:
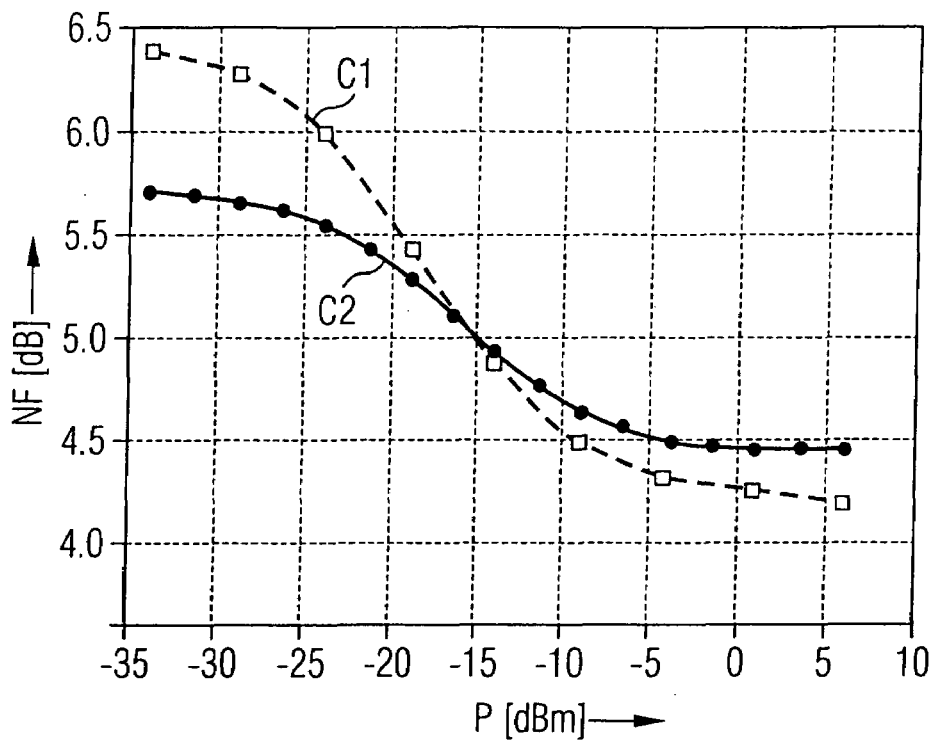
FIG. 1: shows an optical amplification according to the prior art.
Figure 4:
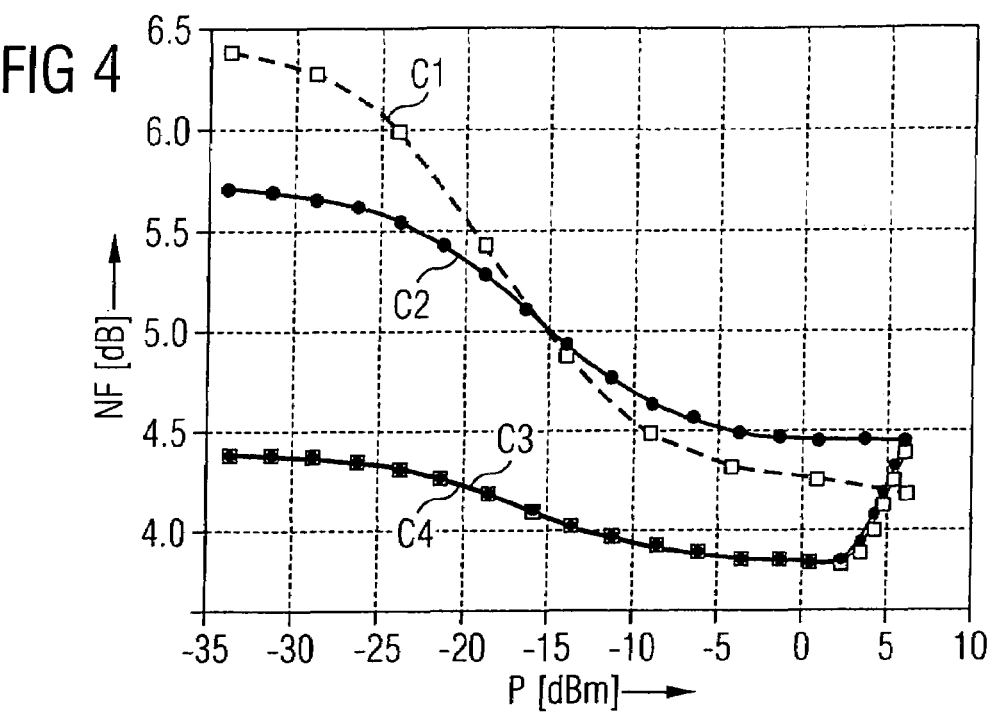
FIG. 4: shows a comparison of the noise figure according to the prior art and according to the inventive method

FIG. 4 shows the noise figure NF according to the inventive method (curves C3 and C4) as a function of the input powers P of the WDM signal compared to the prior art (see also FIG. 1, curve C1 and C2). The pump device used is the one described in FIG. 1, whereby the modulation characteristics A1, A2 correspond to the exemplary embodiment according to the invention shown in FIG. 3. At small and higher input powers P the noise figure remains low.

FIG. 5 shows the schematic principle of the inventive method for controlling a pump device of a fiber amplifier EDFA with more than two pump sources. In certain circumstances, for example in the event of an increase in channel number, a further pump source may be required. The inventive method is suitable for this expansion with external pump modules, which can be added one after another without interruption to operation. With this exemplary embodiment a third pump source 3 is used in addition to the first and second pump source 1, 2 (see FIG. 2) for amplification of a transmitted WDM signal S. Output powers P1, P2, P3 of the first pump source 1, the pump signal of which operates in the input area of the fiber amplifier EDFA, of the second pump source 2, the pump signal of which operates in the further area of the fiber amplifier EDFA, and of the third pump source 3, the pump signal of which operates in the output area of the fiber amplifier EDFA, are controlled in order to achieve a minimal noise figure of the amplified WDM signal S. An actual power IL of the WDM signal S is determined at the output of the fiber amplifier EDFA and compared with a reference power SL, and from this a required total pump power $P_{tot}$ is set. In order to achieve an optimal noise figure of the WDM signal S, the output powers P1, P2, P3 of the pump sources 1, 2, 3 are set as a function of the total pump power $P_{tot}$ such that at a small total pump power$_{tot}$ a high inversion N1 is produced by the first pump source 1 and small inversions N2, N3 are produced by the second and third pump source 2, 3 in the fiber amplifier EDFA. With increasing mean total pump power $P_{tot}$ the pump power P1 of the first pump source 1 increases initially more strongly and subsequently less strongly than the pump power of the second pump source 2 at low pump power of the third pump source 3, with the result that high inversions N1, N2 are produced by the first and second pump source 1, 2 and a small inversion N3 is produced by the third pump source 3. Finally, with increasing large total pump power $P_{tot}$ the pump power of the second pump source 2 increases initially more strongly and subsequently less strongly than the pump power of the third pump source 3.

Modulation characteristics of the three pump sources 1, 2, 3 set the inversions N1, N2, N3 through two distributions V1, V2 of the total pump power $P_{tot}$ to the pump sources 1, 2, 3, whereby the first distribution V1 of the total pump power $P_{tot}$ to the first pump source 1 and to the further pump sources 2, 3 is performed according to settable proportion parameters $f(P_{tot})$, $1-f(P_{tot})$ such that the gradient of $f(P_{tot})$ is positive at a small total pump power Ptot, proceeds constantly, decreases with increasing total pump power $P_{tot}$ and reaches the value zero as a minimum.

The second distribution V2 distributes one of the two previously distributed pump powers $[1-f(P_{tot})] \times P_{tot}$ to the pump source 2 and to the pump source 3 according to settable proportion parameters $g(P_{tot})$, $1-g(P_{tot})$, whereby the gradient of $g(P_{tot})$ is positive and initially, at a small total pump power $P_{tot}$, can be selected greater than the gradient of $f(P_{tot})$, proceeds constantly, decreases with increasing total pump power $P_{tot}$ and reaches the value zero as a minimum.

In order to set the pump powers of the first, second and third pump source 1, 2, 3 appropriately, the proportion parameters f, g or 1−f, 1−g can be retrieved from stored tables.

In the third pump source 3, a plurality of laser diodes $LD3_k$ are operated at k>0, the output powers $L3_k$ of said laser diodes being controlled in each case according to a third distribution to the pump power $[1-g(P_{tot})] \times [1-f(P_{tot})] \times P_{tot}$ provided for the third pump source 3. The output powers $L3_k$ of the individual laser diodes $LD3_k$ are set according to further distribution factors h1, h2, h3, h4 such that, depending on the setting of the distribution factor h1, the third distribution of the pump power $[1-g(P_{tot})] \times [1-f(P_{tot})] \times P_{tot}$ is made on the one hand back to the second pump source 2 and on the other hand to the laser diodes $LD3_k$ of the third pump source 3.

The control of the pump powers P1, P2, P3 according to inventive modulation characteristics A1, A2, A3 is performed as a function of proportion parameters $f(P_{tot})$ and $g(P_{tot})$ according to the following relationships:

$$A1: P1 = f \times P_{tot}$$

$$A2: P2 = (1-f) \times [g + h1 \times (1-g)] \times P_{tot}$$

$$A3: P3 = (1-f) \times [(1-h1) \times (1-g)] \times P_{tot}$$

For reasons of easier representation the proportion parameters $f(P_{tot})$ and $g(P_{tot})$ have been designated by f and g.

Each laser diode $LD3_k$ of the third pump source 3 delivers an output power $P3_k$ at h1=0 which is defined as follows:

$$LD3_k: P3_k = h_{k+1} \times P3 \text{ at } k > 0$$

At the setting h1=1, the pump source 3 is practically switched off, i.e. $P3 = P3_k = 0$ for k>0. Thus, the method applies here for that of FIG. 2 only with the two pump sources 1, 2. The use of the distribution factor h1 (=1 or 0) therefore enables the pump source 3 to be switched on or off.

Figure 6:
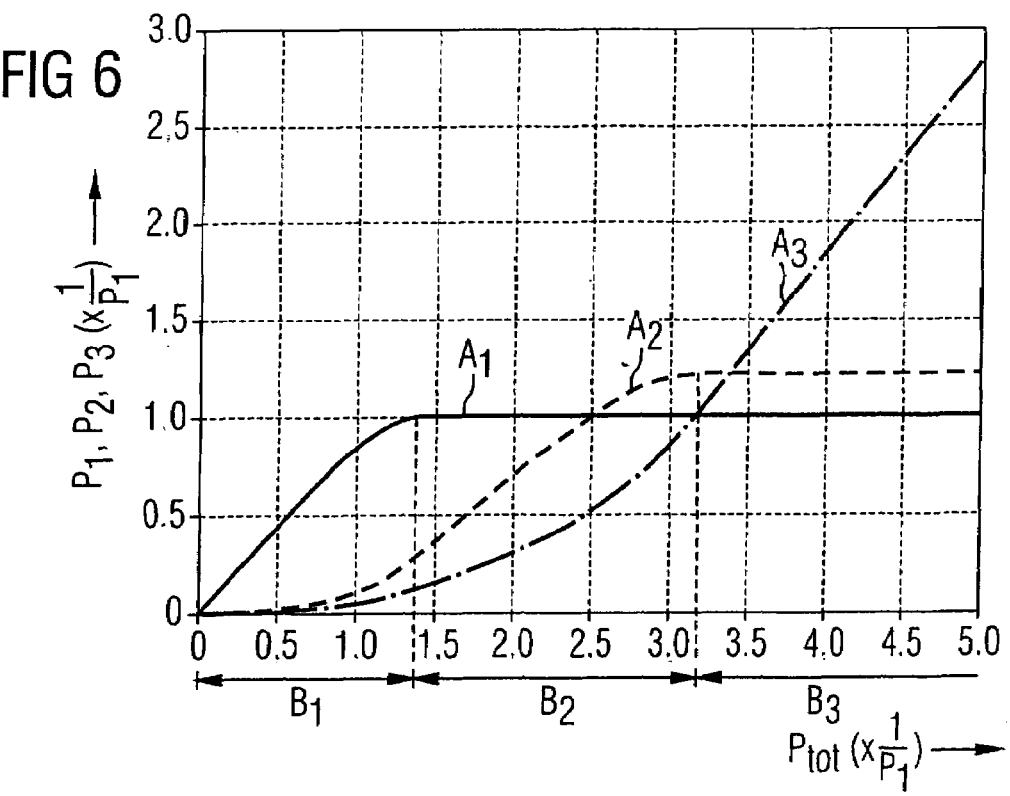
FIG. 6: shows the inventive modulation characteristics for an arrangement as shown in FIG. 5 with three pump sources

FIG. 6 shows inventive modulation characteristics A1, A2, A3 for controlling the output powers P1, P2, P3 of the three pump sources 1, 2, 3 from FIG. 5. Three areas B1, B2, B3 at increasing total pump power $P_{tot}$ show the successive pump power increases of the pump sources 1, 2, 3 in order that the desired conditions for the respective inversions N1, N2, N3 for minimizing the noise figure NF of the WDM signal S at different total pump powers $P_{tot}$ are satisfied.

By adjustment of the modulation characteristics, the inventive method is suitable for pump devices with pump sources 1, 2, 3, ... which inject their pump signals in each case co- and/or contradirectionally into the fiber EDF.

The inventive method can be used for a WDM transmission system using the polarization multiplex technique by expansion of the stored tables for new setting of the proportion parameters f and g as a function of the required total pump power $P_{tot}$.

The invention claimed is:

1. A method for controlling a pump device of a fiber amplifier for amplification of a transmitted wavelength division multiplex signal, comprising a first pump source, the pump signal of which operates in an input area of the fiber amplifier, and with a second pump source, the pump signal of which operates in a further area of the fiber amplifier, wherein an actual power of the wavelength division multiplex signal is determined at the output of the fiber amplifier and the output powers of the two pump sources are controlled in order to adjust a noise figure of the amplified wavelength division multiplex signal, wherein
for a total pump power varying over a total pump power range according to the number of active channels, the determined actual power of the wavelength division multiplex signal is compared with a reference power and wherein a required total pump power $P_{tot}$ is set and wherein
in order to adjust a noise figure of the wavelength division multiplex signal, the output powers of the two pump sources are set as a function of the total pump power $P_{tot}$ such that in the fiber amplifier, at a lower total pump power $P_{tot}$ of the power range, a higher inversion is produced by the first pump source and a lower inversion is produced by the second pump source, and that with increasing total pump power $P_{tot}$ the pump power of the first pump source initially increases at a higher rate of increase and after initially increasing, subsequently increasing at a lower rate of increase than the pump power of the second pump source.

2. A method according to claim 1, wherein modulation characteristics for setting the inversions or the output powers are determined by distribution of the total pump power $P_{tot}$ to the two pump sources, whereby the distribution of the total pump power $P_{tot}$ to the two pump sources is performed according to settable proportion parameters $f(P_{tot})$, $1-f(P_{tot})$, whereby the gradient of $f(P_{tot})$ at a low total pump power $P_{tot}$ is positive, proceeds constantly, decreases with increasing total pump power $P_{tot}$ and reaches the value zero as a minimum.

3. A method according to claim 2 wherein the proportion parameter for 1−f for appropriate setting of the pump powers of the first and second pump source is retrieved from a stored table.

4. A method according to claim 1, wherein pump signals of the pump source are injected co- and/or contradirectionally into an erbium-doped fiber of the fiber amplifier, whereby a pump wavelength of approx. 980 nm and/or 1480 nm is used for the first pump source and pump wavelengths of approx. 980 nm and/or 1480 nm are used for the second pump source.

5. A method for controlling a pump device of a fiber amplifier for amplification of a transmitted wavelength division multiplex signal, comprising:

a first pump source having a first pump signal, the first pump signal operating in an input range of the fiber amplifier; and a second pump source having a second pump signal, the second pump signal operating in a further range of the fiber amplifier, wherein an actual power of the wavelength division multiplex signal is determined at the output of the fiber amplifier and the output powers of the two pump sources are controlled in order to adjust a noise figure of the amplified wavelength division multiplex signal, wherein for a total pump power varying over a total pump power range according to the number of active channels, the determined actual power of the wavelength division multiplex signal is compared with a reference power and wherein a required total pump power $P_{tot}$ is set and wherein in order to adjust a noise figure of the wavelength division multiplex signal the output powers of the two pump sources are set as a function of the total pump power $P_{tot}$ such that in the fiber amplifier, at a lower total pump power $P_{tot}$ of the power range, a higher inversion is produced by the first pump source and a lower inversion is produced by the second pump source, and that with increasing total pump power $P_{tot}$ the pump power of the first pump source initially increases a higher rate of increase and after initially increasing, subsequently increasing at a lower rate of increase than the pump power of the second pump source.

* * * * *